(12) United States Patent
McCormick

(10) Patent No.: US 7,407,234 B1
(45) Date of Patent: Aug. 5, 2008

(54) MANUAL ASSEMBLY TO ABS/TCS/ESP HYDRAULIC UNITS

(75) Inventor: Nathan Rex McCormick, Advance, NC (US)

(73) Assignee: Robert Bosch GmbH, Stutgartt (DE)

( * ) Notice: Subject to any disclaimer, the term of this patent is extended or adjusted under 35 U.S.C. 154(b) by 376 days.

(21) Appl. No.: 11/162,641

(22) Filed: Sep. 17, 2005

(51) Int. Cl.
 *B60T 8/36* (2006.01)
(52) U.S. Cl. ............................. 303/119.3; 303/DIG. 10
(58) Field of Classification Search .............. 303/119.2, 303/119.3, DIG. 10; 248/635
 See application file for complete search history.

(56) References Cited

U.S. PATENT DOCUMENTS

| | | | | |
|---|---|---|---|---|
| 3,471,186 A | * | 10/1969 | Geen et al. | ................... 403/197 |
| 5,066,076 A | * | 11/1991 | Troster | ..................... 303/113.1 |
| 6,098,949 A | * | 8/2000 | Robinson | ..................... 248/635 |
| 6,296,236 B1 | * | 10/2001 | Ott | .......................... 267/140.11 |
| 6,932,439 B2 | * | 8/2005 | Nakazawa | ................ 303/116.4 |
| 2003/0155809 A1 | * | 8/2003 | Schlitzkus et al. | ........ 303/119.3 |

* cited by examiner

*Primary Examiner*—Melanie Torres
(74) *Attorney, Agent, or Firm*—Leo H. McCormick; Sarah Taylor

(57) ABSTRACT

A shock mounting system for affixing a motor driven pump, a plurality of hydraulic valves and accumulators, and motion sensing devices to a vehicle to minimize the transmission of noises to the hydraulic unit and the vehicle. Each mounting point comprising a mounting stud fixed to the vehicle, a hole in the hydraulic unit, a resilient bushing received in the hole, and a plurality of cylindrical segments having outer surfaces contacting the bushing and inner surfaces contacting the stud. Each stud urges the corresponding segments radially outwardly into compressing engagement with an inner surface of the resilient bushing. Each segment includes a retaining rim and each mounting stud includes a corresponding retaining ledge which, upon adequate penetration of the stud into the bushing, allow the segments to collapse under the urging of the resilient bushing radially inwardly inter-engaging the rim and ledges to hold the stud within the bushing.

11 Claims, 4 Drawing Sheets

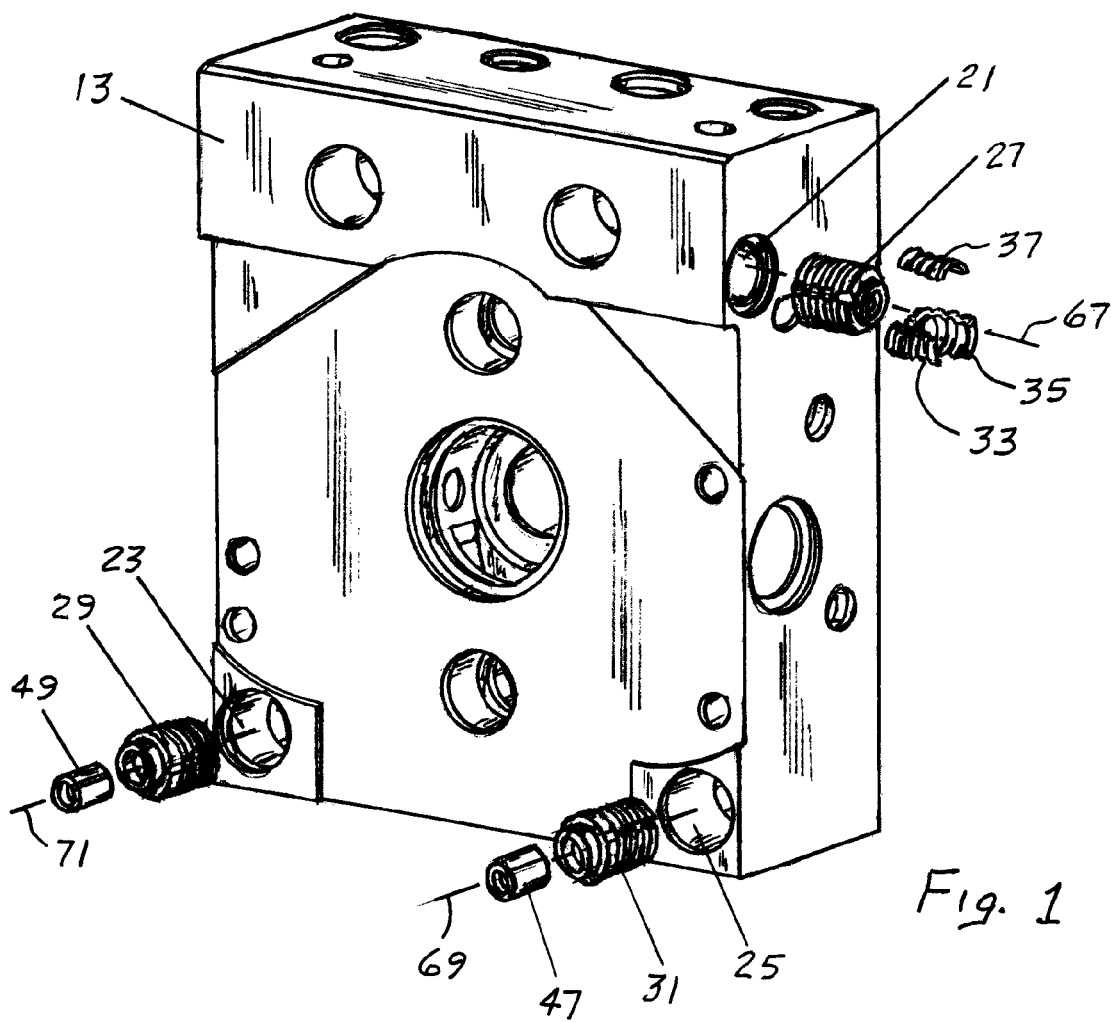
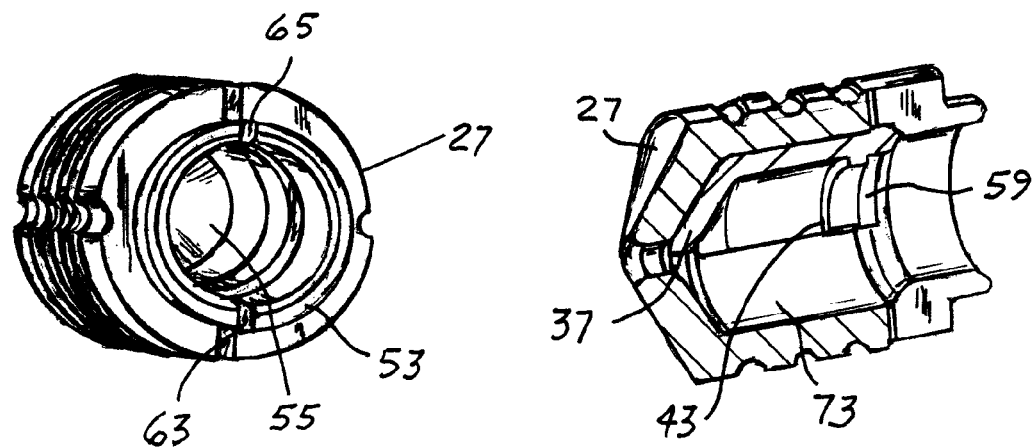

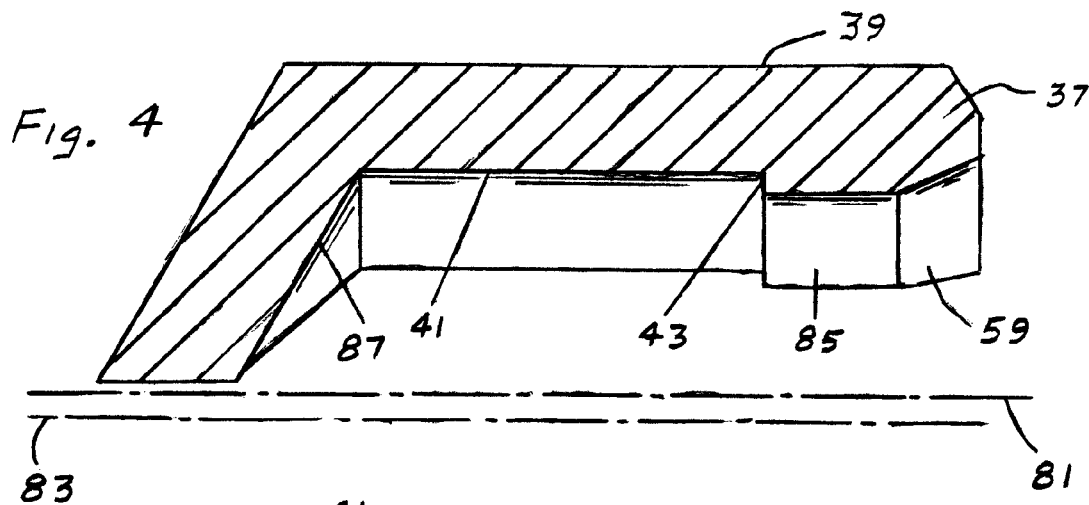
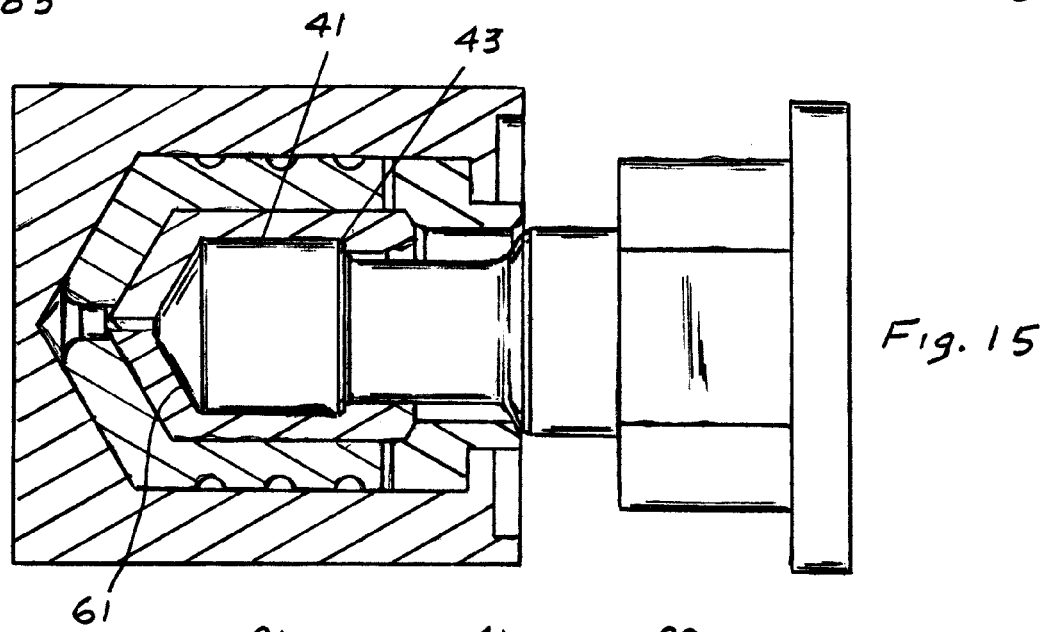
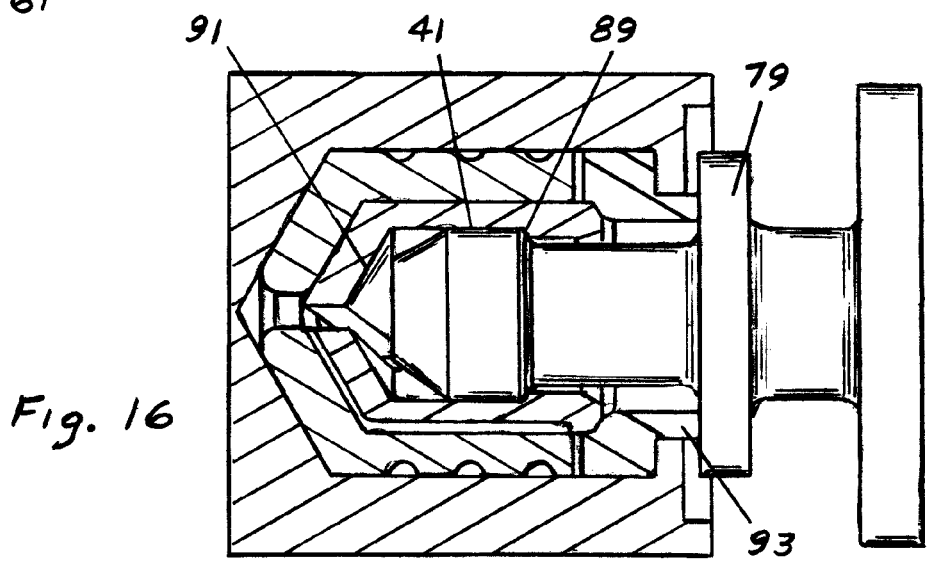

MANUAL ASSEMBLY TO ABS/TCS/ESP HYDRAULIC UNITS

BACKGROUND OF THE INVENTION

This invention relates to apparatus and methods for mounting components such as hydraulic units within vehicles and more particularly to a vibration transmitting isolator and technique for toollessly mounting a hydraulic unit in a vehicle.

There is a trend in the automotive industry to assemble individual components into a functional unit and then mount that unit in the vehicle. For example, motor driven fluid pumps, accumulators, valving and various sensors may be integrated into a vehicle braking unit. It is necessary that the hydraulic unit is not rigidly attached to the vehicle chassis in order to protect the hydraulic unit and its electronics from shocks and vibrations normally experienced by the vehicle. Additionally in the normal operation of the pump and motor system of the hydraulic unit pulsations are created which must be damped from the chassis to avoid excessive vehicle noise. One problem to be solved is finding a shock mounting packaging arrangement that reduces forces needed for hand assembly processes so they are reasonable for the customer. The package must satisfactorily cushion and retain the hydraulic unit in consideration of life of the vehicle and anticipated vibrational and shock excitation in an environment where corrosive substances and temperature extremes may be encountered. Several braking unit mounting techniques have been used such as in a current packaging concept which involves a sheet metal bracket that holds an automotive component (in this example ABS hydraulic unit) requires isolation to protect the component from vehicle vibration and reduce introduction of vehicle noise from the component. Shock mounting may be achieved by resilient washers interposed between mounting bolts and the vehicle framework, or by integrated resilient dampers pressed into the hydraulic unit housing which support bolts or threaded studs extending from the housing. With this concept, significant customer concern has been expressed at the high press in forces required to assemble hydraulic units into the bracket and there are often customer complaints regarding those high press-in forces as well as ongoing quality problems regarding torquing fasteners supplied as part of component. In one case, because of hydraulic unit geometry such as location of the electronic control unit (ECU) connector, this stamped geometry has small ears which are easily deformed causing quality problems at customer as well as additional preventative costs at bracket suppliers. By eliminating a sheet metal interface to the hydraulic unit and replacing it with more robust studs, this problem could be eliminated. In another case, integrated dampers have the problem that they do not significantly resist rotation about pin axes. This means that the isolator in the hydraulic unit housing begins to turn before a sufficient hold torque can be reached when torquing the nuts during customer assembly. By eliminating the thread and fastener this problem could be eliminated. Often, the distance of the hydraulic unit center of gravity from customer connection points has created a cantilevered mass which amplifies vibrations and causes isolator wear. This creates additional effort in finding adjustments to this packaging technique so that components meet endurance requirement It is desirable to provide a packaging concept for antilock braking systems, traction control systems or electronic stability program (ABS/TCS/ESP) hydraulic unit connection to a vehicle which provides for ease of customer assembly while robustly retaining and isolating hydraulic unit throughout expected vehicle life.

SUMMARY OF THE INVENTION

The present invention provides a new packaging concept which integrates all isolators into the component housing rubber isolators or bushings in a matching bore. Contained in the rubber isolator is a retaining sleeve split in multiple (for example 3), pieces which forms a cylindrical subassembly part when held together by the rubber isolator. This isolator and sleeve sub-assembly is retained by housing material which is crimped or deformed over rubber geometry. The sleeve(s) accept and retain customer mounting stud(s) upon customer assembly. This process requires low assembly force and needs no tooling allowing for complete hand assembly of the automotive component into the vehicle interface bracket.

The invention comprises, in one form thereof a hydraulic control unit with a pair of generally parallel cylindrical bores and a third cylindrical bore having a cylindrical axis extending generally perpendicular to the parallel cylindrical bores. The parallel bores are adapted to receive a pair of generally parallel support pins and the third cylindrical bore is adapted to receive a transverse support pin. There are three isolators or bushings, each received in a corresponding cylindrical bore for providing mechanical vibration isolation between the support pins and the unit. A plurality of wedges are disposed within each bushing to be engaged by and expanded radially outwardly by the introduction of a support pin into the corresponding bushing. Each wedge segment includes a tapered region near one end of the cylindrical bore and each support pin includes a leading end having a similarly tapered region to mate with the segment tapered regions to facilitate introduction of the support pin into the bore.

Also according to the invention, a method of assembling a hydraulic control unit to a vehicle so as to limit vibrational transmission between the unit and the vehicle begins by forming a cylindrical bore in the unit. Independently, a generally cylindrical annular resilient isolator; is provided and an annular inner surface of the isolator lined with a plurality of metallic wedges. The wedge lined isolator is then introduced into the bore and retained therein. A generally cylindrical pin which is fixable to the vehicle is inserted into the isolator annular interior to force the wedges radially outwardly away from one another and those wedges are subsequently allowed to rebound somewhat radially inwardly under the urging of the resilient isolator when the inserted pin reaches a preferred penetration to rigidly secure the pin within the isolator. In creating a three point mounting configuration, the steps of forming, providing, lining, introducing and retaining are performed three times to create a set of cylindrical bores, each containing a wedge lined isolator, while the steps of inserting and allowing are performed first on a single wedge lined isolator containing cylindrical bore. Thereafter the unit is rotated about the single inserted pin to align the remaining two wedge lined isolator containing cylindrical bores with corresponding pins and the steps of inserting and allowing are performed in unison for the remaining wedge lined isolator containing cylindrical bores. The force required to insert the a pin into the isolator annular interior and force the wedges radially outwardly away from one another may be reduced by forming a taper on a leading end of the generally cylindrical pin and a corresponding taper on the wedge ends last introduced into the bore.

An advantage of the present invention is that the integration of isolators into the housing protects them from exposure to incompatible media such as certain oils which can negatively react with rubber.

Another advantage is the location in the housing of the isolation points helps to more robustly hold the hydraulic unit.

A further advantage resides in the elimination of the sliding interface between rubber and metal that exists in existing production packaging concepts thereby reducing required customer assembly forces.

Yet another advantage of the present invention is that the center of gravity is surrounded by isolation connection points reducing unit response to vibrational acceleration and reducing wear of isolators. The more robust holding of the three isolators being compressed and surrounding the center of gravity enables the integration of sensors into the hydraulic unit electronic control unit which are needed for ESP function such as yaw and acceleration sensors.

A further advantage is the elimination of the fasteners from the motor side isolators which solves many quality problems experienced with prior packaging approaches. Customer dissatisfaction has been expressed because defective cold headed threaded parts were found at the customer that required additional torque. When defective thread geometries were torqued with normal customer process parameters, the isolators did not reach the final assembled position.

A still further advantage is the robustness of this package which will allow the realization of new products, for example, where yaw rate sensors are incorporated into the hydraulic unit, or much larger hydraulic unit sizes which need a more robust holder concept compared to current products, as well as the cost effective packaging of various hydraulic unit products including hydraulic units with various accumulator sizes.

BRIEF DESCRIPTION OF THE DRAWINGS

FIG. 1 is a partially exploded isometric view of a hydraulic unit housing, isolators and isolator inserts;

FIG. 2 is an isometric view of an illustrative resilient cylindrical bushing or isolator with wedges assembled therein;

FIG. 3 is an isometric view in cross-section of the isolator showing one of three insert segments or wedges in place;

FIG. 4 is an isometric view of an insert segment in cross-section;

FIG. 15 is a cross-sectional view similar to FIG. 14, but illustrating details of one pin retention technique;

FIG. 16 is a cross-sectional view of an alternate pin retention technique;

Corresponding reference characters indicate corresponding parts throughout the several drawing views.

DETAILED DESCRIPTION OF THE INVENTION

Figure 5:
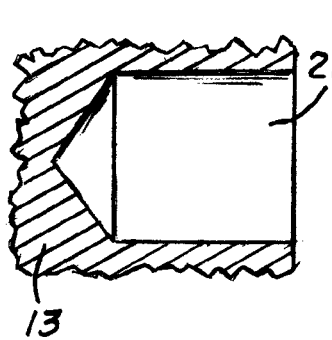
FIG. 5 is a view of a portion of the hydraulic unit in cross-section showing an illustrative bore.

Referring now to the drawings in general, there is shown a shock mounting system for affixing a hydraulic unit 11 of a type having a housing 13 and motor 15 driven pump as well as possible hydraulic valves, accumulators and motion sensing devices, to a vehicle to minimize the transmission of road and vehicle noises to the hydraulic unit and the transmission of unit operating noise to the vehicle. As illustrated, the hydraulic unit is shock mounted to a bracket 17 at three mounting points. Each mounting point comprises a mounting stud such as 19 which is fixed to the vehicle, for example, to the bracket 17, which would typically be previously affixed to the vehicle body in production. Each mounting point further includes a hole 21, 23, or 25 in the hydraulic unit 11 housing 13 with a resilient bushing 27, 29 or 31 received in the hole. The hydraulic control unit 13 thus has a pair of generally parallel cylindrical bores 23 and 25, and a third cylindrical bore 27 having a cylindrical axis 67 extending generally perpendicular to the parallel cylindrical bore axes 69 and 71. Each bushing or isolator carries a plurality (three as illustrated) of cylindrical segments 33, 35, 37 having outer surfaces 39 contacting the bushing and inner surfaces 41 for contacting the stud or pin 19. Each stud 19 urges the corresponding segments radially outwardly into compressing engagement with an inner surface 73 of the resilient bushing. Each segment includes a retaining rim 43 and each mounting stud includes a corresponding retaining ledge 45 which, upon adequate penetration of the stud into the bushing, allow the segments to collapse under the urging of the resilient bushing 27, 29 or 31 radially inwardly inter-engaging the rim and ledges to hold the stud within the bushing as best shown in FIGS. 12-16.

In FIG. 1, the bushing or isolator 27 together with the three metal insert segments or wedges 33, 35 and 37 comprise a resilient bushing assembly for mounting the vehicle hydraulic braking unit 11 to a vehicle while providing mechanical vibration isolation between the unit and the vehicle. Bushing 31 and segments 47 as well as bushing 29 and segments 49 comprise two more assemblies for a three point attachment system. Each resilient cylindrical bushing 27, 29 or 31 has an axially extending stepped cylindrical bushing bore 51 (FIG. 6) extending from one open bushing end 53 less than completely through the liner. A plurality of like cylindrical segments 33, 35 and 37 are alignable as shown at 47 and 49 to form a bushing bore liner to be introduced into and held captive within the stepped cylindrical bushing bore 51. The bushing bore liner, in turn, has an axially extending stepped cylindrical liner bore 55 (FIGS. 2 and 8) extending from the one open end 53 less than completely through the liner for receiving and retaining a mounting stud 57 (FIGS. 12-14) when the unit is mounted to the vehicle.

Figure 7:
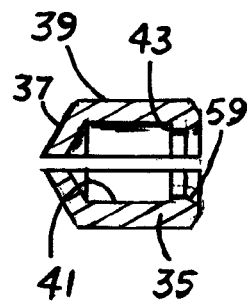
FIG. 7 is a cross-sectional view showing two of three insert segments.
Figure 8:
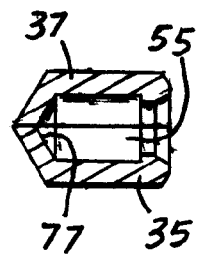
FIG. 8 is a cross-sectional view of the insert segments of FIG. 7 preparatory to introduction into the isolator.
Figure 12:
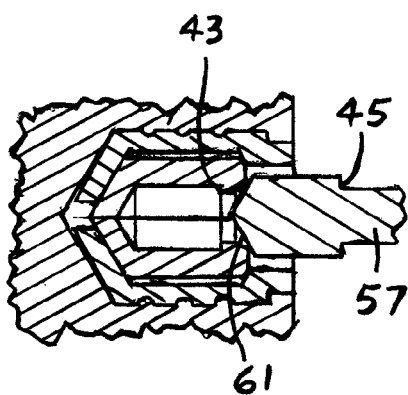
FIGS. 12-14 are cross-sectional views showing the sequence of inserting a mounting pin or stud into the isolator lined housing of FIG. 11.
Figure 13:
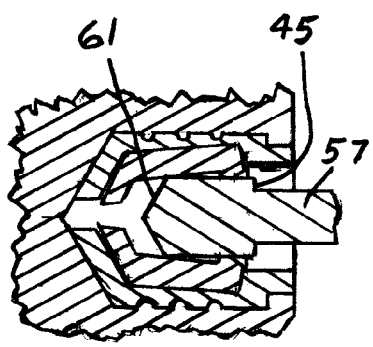
Figure 14:
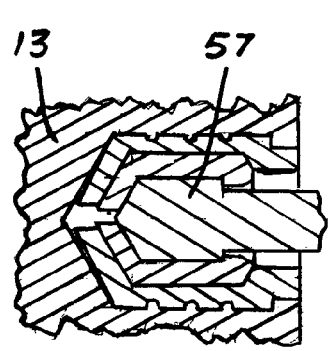

The segments may be collapsed radially toward one another as best seen by comparing FIGS. 7 and 8 for introduction into the bushing bore 51 and later expanded radially outwardly away from one another for receiving the mounting stud as shown in FIGS. 12-14. The axes of individual cylindrical segments coincide and the segments assume a true cylindrical configuration when the segments are spaced from one another as in FIG. 7 and when retaining the mounting stud as in FIGS. 14-16, but when the segments are collapsed radially inwardly as in FIGS. 8-12, the individual segment axes extend parallel to and are radially displaced from one another as shown in FIG. 4.

To facilitate introduction of the mounting studs such as 57 into the liner bore 55, the segments such as 35 and 37 include a tapered region 59 (FIGS. 3, 4, 7 and 10) near the one open end 53 of the cylindrical bushing bore 51. Mounting stud 57 includes a leading end having a similarly tapered region 61 (FIGS. 12, 13 and 15) to mate with the segment tapered regions 59. Each segment or wedge includes a retaining rim 43 (FIGS. 3, 4, 7, 12 and 15) and the mounting studs 57 include corresponding retaining ledges such as 45 in FIG. 12 so that, upon adequate penetration of a mounting stud into a corresponding bushing, the segments 35 and 37 may collapse radially inwardly as seen in comparing FIGS. 13 and 14 under the resilient urging of the bushing 27 causing the retaining ledges 43 to engage the retaining rim 45 to prevent inadvertent withdrawal of the mounting stud from the bushing.

This new implementation of vibration isolators/dampers in a hydraulic unit includes new components as well as a new definition of the customer interface and the process of customer assembly of the hydraulic unit into the customer bracket/interface. The isolators 27, 29 and 31 may be butyl rubber which is traditionally used for hydraulic unit isolation. They are integrated into the hydraulic unit housing 13 by machining three bores 21, 23 and 25 into the housing 13 with two (23 and 25) on the motor side and one (21) on the side of the housing opposite from an electronic control unit connector. In each of the bores an isolator pre-assembly is inserted during hydraulic unit production. This pre-assembly includes the rubber isolator 27, 29 or 31 as well as a retaining sleeve such as 47 or 49 composed of multiple wedges such as 33, 35 and 37. Three wedges are shown, but it could be imagined with two or more than three, which when mated with one another give the sleeve a cylindrical shape that is retained in the isolator with a slight press-fit. The outer geometry of the sleeve mates to the isolators inner geometry. The isolator itself may include slits such as 63 and 65 of FIG. 2 which allow it to open and receive the retaining sleeve 47 or 49. The isolator may be an injection molded part while the sleeve wedges can be cold headed steel parts. The assembly of the sleeve into the isolator may occur during hydraulic unit assembly or as a purchased pre-assembly. After the isolator pre-assembly is pressed into the housing, a segment staking process or crimping is used as illustrated at 75 in the transition from FIG. 10 to FIG. 11 to deform housing material behind the isolator thus retaining it in the pump housing. The customer interface typically consists of three studs 19, 57 and another 95 which extends parallel to stud 19 from the lower portion of bracket 17, but is hidden from view in FIG. 17 by motor 15. The parallel bores 23 and 25 are adapted to receive the pair of generally parallel support pins 19 and 95 and the third cylindrical bore 21 is adapted to receive a support pin 57 extending transversely from the support bracket 17. These studs may be implemented into a traditional one or multiple piece bracket such as 17, or they could be directly attached to frame geometry itself by either frame welds or the incorporation of fastener geometry into the studs which would allow them to be assembled into customer frame holes as traditional fasteners are assembled. The studs themselves could be cold headed or turned steel parts.

Figure 6:
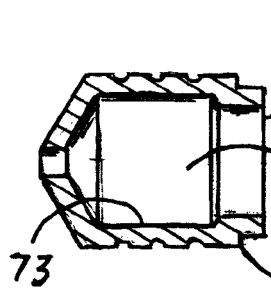
FIG. 6 is a cross-sectional view of an illustrative isolator.
Figure 9:
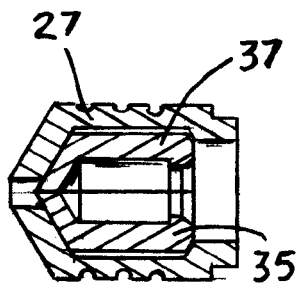
FIG. 9 is a cross-sectional view the isolator with insert segments lining the bore.
Figure 10:
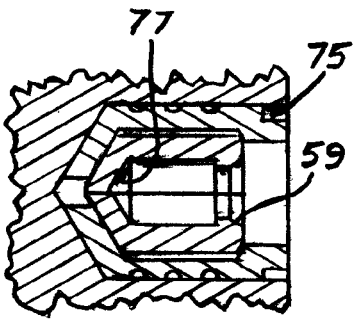
FIG. 10 is a cross-sectional view of the bore lined isolator of FIG. 9 introduced into the housing bore.
Figure 11:
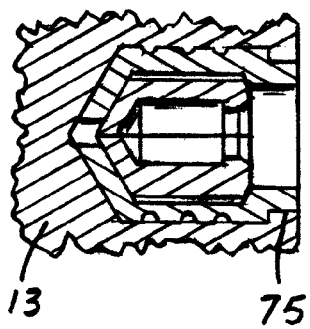
FIG. 11 is a cross-sectional view similar to FIG. 10, but showing the isolator retained within the housing bore.

The process of assembling a hydraulic control unit to a vehicle may be summarized by referring to FIGS. 5-14. First a cylindrical bore 21 is formed in the unit 13 as shown by FIG. 5. Then a generally cylindrical annular resilient isolator 27 of FIG. 6 is provided having an annular inner surface 73. That inner surface is lined by a plurality of metallic wedges as shown in FIG. 9. The wedge lined isolator is then introducing into the bore 21, compare FIGS. 9 and 10, and retained therein, for example, by staking at 75 or 93 (FIG. 16), compare FIGS. 10 and 11, or by any other suitable technique. A preliminary step of fixing the cylindrical pin to the vehicle or vehicle bracket has occurred by this time. A generally cylindrical pin 57 is next inserted into the isolator annular interior to force the wedges radially outwardly away from one another as seen in the sequence of FIGS. 12 and 13 after which, the wedges are allowed to rebound somewhat radially inwardly under the urging of the resilient isolator toward the position of FIG. 14. When the inserted pin reaches a preferred penetration, surfaces 43 and 45 interlock to rigidly secure the pin within the isolator. The preferred penetration is determined by the taper 61 on the leading end of the pin engaging a correspondingly tapered inner surface 77 of the wedges or by the flange 79 (FIG. 16) engaging the hydraulic unit.

The interaction of the customer stud with the integrated isolator sub-assembly is as follows. The stud is inserted into the isolator by moving either bracket 17 or studs towards hydraulic unit 13 or in the case where the hydraulic unit is being assembled to a chassis already including studs then the hydraulic unit would be moved towards the studs. As the stud enters the isolator it contacts the wedges which form a retaining sleeve. Chamfers 59, 61 on stud and retaining sleeve together with the force of the inserted stud causes the sleeve to open when individual wedges move away from the center axis thus further compressing isolator 27 material, see FIG. 13. The stud moves into the sleeve until a recess 45 in the stud and recess 43 in the internal diameter of the sleeve allow the sleeve wedges to snap back towards center axis fully seating against the stud. This snapping would be accompanied with a noise and vibration that is noticeable to an operator. This feedback allows the assembly worker to have confirmation part is correctly assembled. The isolator remains in a state of compression which exceeds the level of compression after hydraulic unit assembly. This compression holds sleeves against stud and an internal ledge of the retaining sleeve locks the stud inside of the isolator. It should be noted that the sleeve outer diameter and inner diameter do not have a coincident center axis. The outer diameter which is cylindrical before stud assembly has a center axis 81 (FIG. 4) at the center of the sleeve. The inner faces of the wedge segments are individually cylindrical but about an axis 83 that is not coincident with center line of sleeve before stud assembly. In FIG. 4, surfaces 39 and 59 are cylindrical segments centered on axis 81, surface 59 is a conical surface having a projected apex existing on axis 81, and surfaces 41 is cylindrical about axis 88 while surfaces 43 and 87 are conical segments with projected apexes on axis 83. This is advantageous so that the inner faces of the retaining sleeve mate to the customer stud after customer assembly has moved the individual wedges away from the housing bore center.

There are two alternative embodiments of the customer stud isolator interface, which provide alternative concepts for preventing axial movement of the stud after customer assembly shown in FIGS. 15 and 16 respectively. In FIG. 15, the stud does not contact retaining sleeve on its major diameter at 41 (FIGS. 7 and 15). Instead the lead in chamfer 61 of the stud contacts a mating surface 77 (FIGS. 8 and 10) at a matching angle on the inside of the sleeve. The other surface of contact is the retaining ledge 43 of the sleeve itself. This allows for only two surfaces of contact in all conditions allowed by part tolerances and the compressive force pushing the retaining sleeve inwards prevents axial movement. Thus, a clearance is insured for the major diameter of the stud. In FIG. 16, the stud major diameter contacts the retaining sleeve on its inner diameter 41 and on the angled surface which creates a recession in the stud and mates to the retaining sleeve ledge 89 which holds the stud in the isolator. The end of the stud has sufficient clearance 91 so that it cannot contact the back surface of the retaining sleeve. To prevent axial motion, a flange 79 is added to the stud geometry which compresses isolator material extending outside of housing staking 93.

Figure 17:
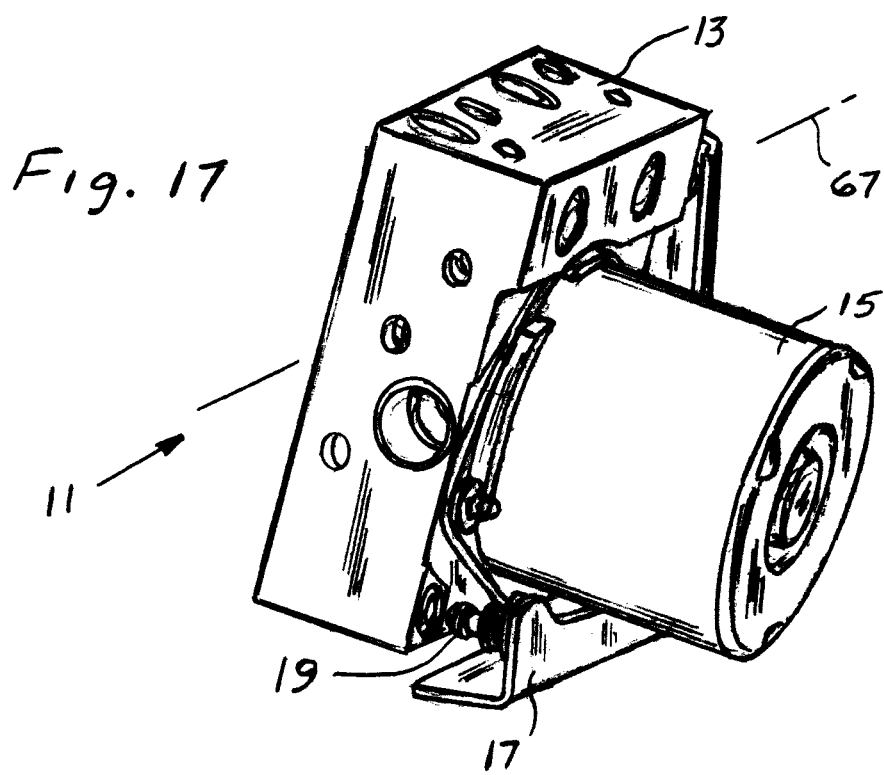
FIG. 17 is an isometric view of a hydraulic unit during the stud mounting process.
Figure 18:
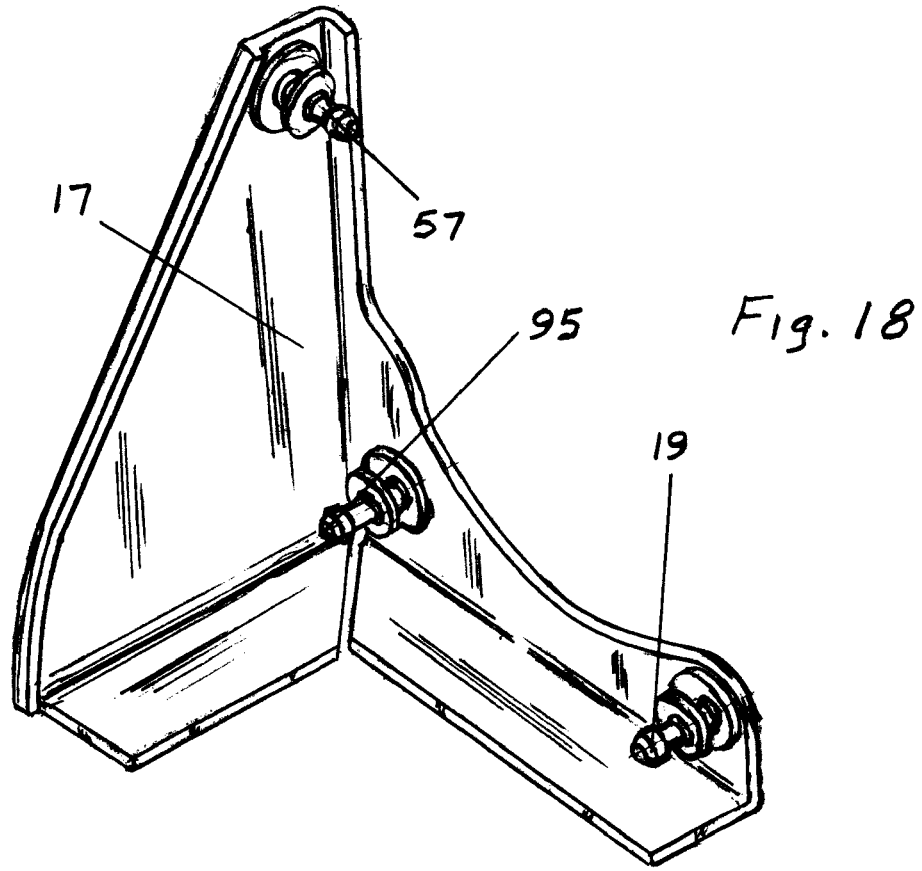
FIG. 18 is an isometric view of a hydraulic unit mounting bracket and attached mounting pins.

The assembly process for a hydraulic unit into the vehicle in general is to first line up a side isolator 27 with side customer stud 57. The hydraulic unit is pressed onto this stud until it snaps into place as illustrated in FIG. 17. The inner surfaces of side retaining sleeve together with outer stud diameter create a bearing surface so that the hydraulic unit may be rotated about axis 67. The hydraulic unit is rotated until the two remaining studs 19 and 95 enter the vibration dampers 29 and 31 respectively on the motor side of the hydraulic unit. This rotation of hydraulic unit is continued until the two remaining retaining sleeves snap into place on their respective studs. The hydraulic unit is then in its final assembled position.

The internal retaining ledge 43 of the retaining sleeve should have a very steep angle, possibly 80-85 degrees in comparison to the stud axis. This insures a robust retention of the hydraulic unit. However should hydraulic unit disassembly from the bracket become necessary, a large axial force on the stud could cause the retaining sleeve wedges to again separate allowing the stud to exit. This large axial force could be achieved with a simple tool having a lever arm which is only used as a part of a rework station.

What is claimed is:

1. A hydraulic control unit having a pair of generally parallel cylindrical bores and a third cylindrical bore having a cylindrical axis extending generally perpendicular to the parallel cylindrical bores, the parallel bores adapted to receive a pair of generally parallel support pins and the third cylindrical bore adapted to receive a transverse support pin, and three bushings, each received in a corresponding cylindrical bore for providing mechanical vibration isolation between the support pins and the unit, and further including a plurality of wedges within each bushing to be engaged by and expanded radially outwardly by the introduction of a support pin into the corresponding bushing.

2. The control unit of claim 1, wherein each wedge includes a retaining rim and the support pins include corresponding retaining ledges whereby, upon adequate penetration of a support pin into a corresponding bushing, the wedges may collapse radially inwardly under the resilient urging of the bushing causing the retaining ledges to engage the retaining rim to prevent inadvertent withdrawal of the support pin from the bushing.

3. The control unit of claim 1, wherein each segment includes a tapered region near one end of the cylindrical bore and each support pin includes a leading end having a similarly tapered region to mate with the segment tapered regions to facilitate introduction of the support pin into the bore.

4. A method of assembling a hydraulic control unit to a vehicle to limit vibrational transmission between the unit and the vehicle, comprising:
    forming a cylindrical bore in the unit;
    providing a generally cylindrical annular resilient isolator;
    lining an annular inner surface of the isolator with a plurality of metallic wedges introducing the wedge lined isolator into the bore;
    retaining the isolator within the bore;
    inserting a generally cylindrical pin into the isolator annular interior to force the wedges radially outwardly away from one another;
    allowing the wedges to rebound somewhat radially inwardly under the urging of the resilient isolator when the inserted pin reaches a preferred penetration to rigidly secure the pin within the isolator.

5. The method of claim 4, including the preliminary step of fixing the cylindrical pin to the vehicle.

6. The method of claim 4, wherein the steps of forming, providing, lining, introducing and retaining are performed a plurality of times to create a set of cylindrical bores, each containing a wedge lined isolator, while the steps of inserting and allowing are performed first on a single wedge lined isolator containing cylindrical bore, and including the additional step of rotating the unit about the single inserted pin to align the remaining wedge lined isolator containing cylindrical bores with corresponding pins and thereafter repeating the steps of inserting and allowing in unison for the remaining wedge lined isolator containing cylindrical bores.

7. The method of claim 4, wherein the force required to insert the a pin into the isolator annular interior and force the wedges radially outwardly away from one another is reduced by forming a taper on a leading end of the generally cylindrical pin and a corresponding taper on the wedge ends last introduced into the bore.

8. The method of claim 4, wherein the step of lining is performed by radially collapsing the metallic wedges toward one another, and passing the collapsed wedges axially into the isolator.

9. The method of claim 4 wherein a taper is formed on a leading end of the generally cylindrical pin and the preferred penetration is determined by the taper engaging a correspondingly tapered inner surface of the wedges.

10. The method of claim 4 wherein the cylindrical pin includes a flange and the preferred penetration is determined by the flange engaging the hydraulic unit.

11. A three point shock mounting system for affixing a hydraulic unit of a type having a motor driven pump, a plurality of hydraulic valves and accumulators, and motion sensing devices to a vehicle to minimize the transmission of road and vehicle noises to the hydraulic unit and the transmission of unit operating noise to the vehicle, characterized by each mounting point comprising a mounting stud fixed to the vehicle, a hole in the hydraulic unit, a resilient bushing received in the hole, and a plurality of cylindrical segments having outer surfaces contacting the bushing and inner surfaces contacting the stud; and wherein each stud urges the corresponding segments radially outwardly into compressing engagement with an inner surface of the resilient bushing, and each segment including a retaining rim and each mounting stud including a corresponding retaining ledge which, upon adequate penetration of the stud into the bushing, allow the segments to collapse under the urging of the resilient bushing radially inwardly interengaging the rim and ledges to hold the stud within the bushing.

* * * * *